June 4, 1957 R. R. ROUP 2,794,940

MULTIPLE K DIELECTRIC

Filed Dec. 26, 1952

INVENTOR.
ROLLAND R. ROUP
BY John W. Michael
ATTORNEY

United States Patent Office 2,794,940

Patented June 4, 1957

2,794,940

MULTIPLE K DIELECTRIC

Rolland R. Roup, Milwaukee, Wis., assignor to Globe-Union Inc., Milwaukee, Wis., a corporation of Delaware Application December 26, 1952, Serial No. 328,091

7 Claims. (Cl. 317—101)

This invention relates to solid dielectric bodies which have varying electrical characteristics for selected portions.

Printed electronic circuits embodying components of resistance, capacitance, and inductance, including connectors and leads therefor (hereinafter referred to collectively as diverse impedance elements), are mounted on dielectric plates or bodies usually made of compositions of ceramic dielectric materials having a selected dielectric constant (hereinafter designated K), temperature coefficient of dielectric constant (hereinafter designated TC), and/or piezo-electric characteristic. Some compositions produce a relatively low K (100 and under) and the TC thereof may be varied by addition of rare earths (U. S. Patent 2,398,088, issued April 9, 1946 to Ehlers and Roup) from above a positive of 100 p. p. m. (parts per milllion) to below a negative of 750 p. p. m. Other compositions may produce an intermediate K (100 to 1000) and TC values extending below a negative of 5250 p. p. m. Still other compositions may produce a relatively high K (1000 to over 8000, see for example U. S. Patent 2,520,376 issued August 29, 1950 to Roup and Butler). The curves of K plotted against temperature of many of these compositions vary from high sharp peaks over limited range of temperature to lower broader peaks. Some of such peaks occur at high temperature, some occur at room temperature, and some occur at low temperature.

Heretofore each specially characterized dielectric has been placed in a separate body. For one example, disc capacitors with high K bodies have been soldered to circuitry printed on low K bodies (U. S. Patent 2,493,199 issued January 3, 1950 to Khouri and Fischer). Such use of dielectric bodies with special characteristics has been costly because each unit required a number of separately made components, complex assembly and soldering, or the application of extra isolating layers. (See U. S. Patent 2,566,666 issued September 4, 1951 to Khouri and Wolff.) While there have been units employing a single base plate with a uniform K or TC throughout supporting a capacitance and other diverse impedance elements they have had limited application for some of the following reasons: It is necessary to prevent detrimental capacitive coupling between the other diverse impedance elements. The TC cannot be varied. Where two or more capacitances are required their values cannot differ enough to meet present demands.

It is an object of this invention therefore to provide a single dielectric body which has portions thereof characterized by different values of K, TC, piezo-electric character, or other characteristics, such as leakage, or any combinations thereof.

Another object is to provide a process for making such a single dielectric plate.

Such a single plate may, for example, support and provide the dielectric for a multiplicity of capacitors of widely varying values of K or TC; support capacitance and other diverse impedance elements and provide a high K for the capacitance and a lower K for the other elements;

support a single capacitance and provide a composite dielectric resulting in a capacitance with a K to temperature curve having a lowered and broadened peak; and support the plates for a piezo-electric element and other diverse impedance elements.

In general, such a single body consists of adjacent portions formed of different ceramic compositions which have been fired to maturity at the same time without occurrence of damaging eutectics or strains or cracking at the juncture or coalescent area. The process employs two or more ceramic compositions of different characteristics prepared in pelleting powder and placed in a pelleting die with a minimum of mixing at the plane of meeting. The powders are pressed simultaneously and then removed as a single pellet and fired to maturity. The powders must be compatible as hereinafter explained in detail. The resulting structurally continuous single pellet or body will have adjacent areas or portions of different predetermined characteristics of K, TC, piezo-electric, or other controlled characteristics.

Compatible compositions or mixtures of ceramic materials have to be chosen in accordance with the following general conditions:

1. Each composition must fire to a satisfactory state of maturity under the same conditions of firing cycle, temperature, and kiln atmosphere.

2. The different compositions in contact with each other must not form excessive melting point eutectics which are lower than the firing temperature at which the individual materials mature.

3. Each of adjacent compositions when fired must have a coefficient of expansion closely enough alike to permit cooling from the firing temperature to room or ambient temperatures without setting up sufficient strain to unduly stress and weaken either composition or the juncture or coalescent area.

4. The firing shrinkages of adjacent compositions should be closely enough alike to prevent tearing or cracking. To obtain good appearance and to conform to normal dimensional tolerances it is preferable to have reasonably similar firing shrinkages.

Single bodies may be made of compatible compositions and have an area with a low K say 95 and an adjacent area with a high K say 6300. Two such high K areas may be separated by an intermediate buffer area of such a low K. Bodies have been made with an area having a low K of 6 and an area with a higher K of 80. Single bodies may also be made of compatible compositions and have an area with a negative TC as low as N 750 p. p. m. and an adjacent area with a positive TC of P 110. Bodies may also be made having an area with piezo-electric characteristics and another area of dielectric property but without piezo-electric characteristics. The foregoing limitations are not critical and other compatible compositions may be selected which extend those given.

Compatible compositions can include:

1. Varying values of high K material and controlled TC material.
2. Positive TC material and negative TC material.
3. Zero TC material and negative or positive TC material.
4. High K materials with peaks at different temperatures.
5. High K materials and low K materials.

The following examples illustrate various compositions of solid dielectric bodies embodying the invention and illustrate a process by which it may be practiced but the invention is not to be limited thereto. For better understanding reference may be had to the accompanying drawing, in which.

Figures 1, 2, 4:
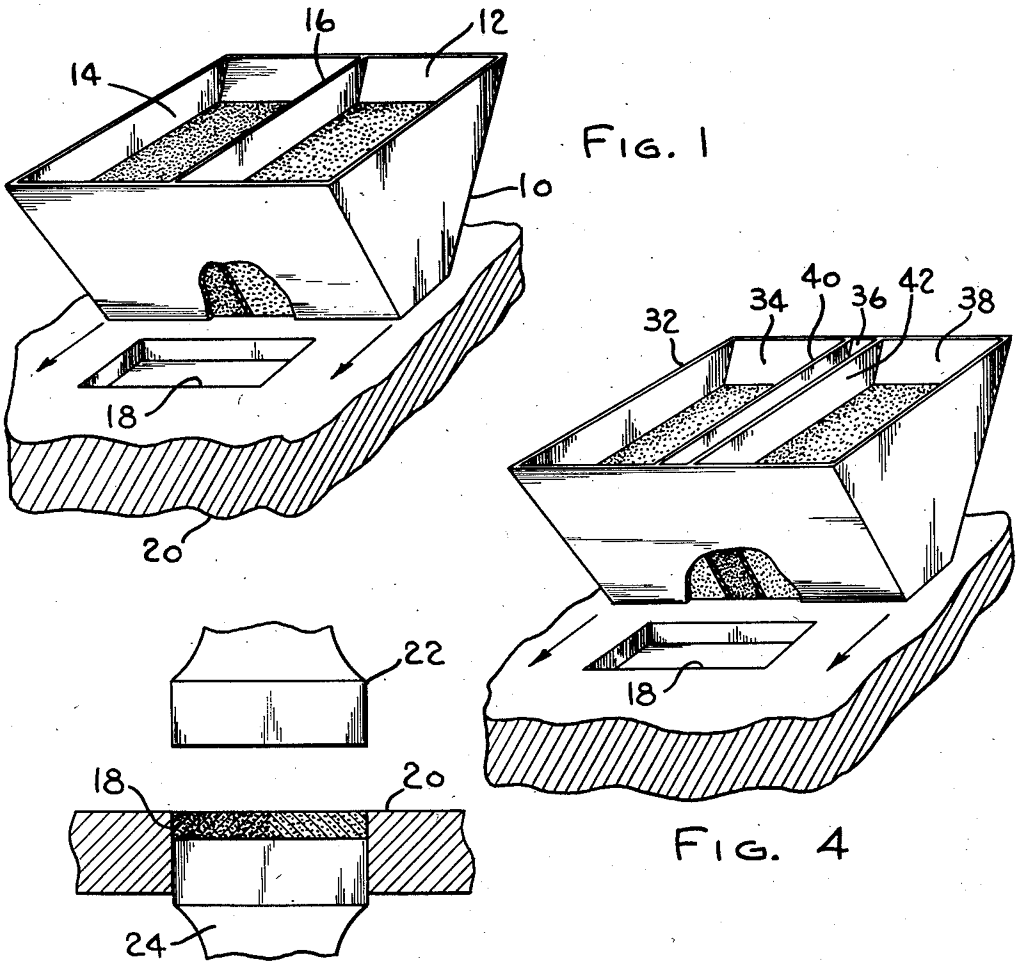
Fig. 1 is a perspective view of a two-cavity filler shoe and a pelleting die and press used in the process of making dielectric bodies embodying the present invention.
Fig. 2 is a fragmentary cross sectional view through the pelleting die and press showing two compatible compositions of dielectric material deposited therein prior to pressing.
Fig. 4 is a perspective view of a three-cavity filler shoe used in the process of making a modified form of dielectric body embodying the present invention.
Figure 3:
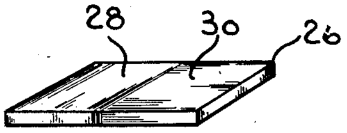
Fig. 3 is a perspective view of the dielectric body resulting from pressing the material shown in Fig. 2.

The filler shoes and pelleting dies and presses illustrated in the drawing may be used to form pellets or bodies using the compatible compositions hereinafter described for various specific examples. The filler shoe 10 illustrated in Fig. 1 has two adjacent compartments 12 and 14 separated by a single dividing wall 16. One compartment of the filler shoe is charged with one of the two compatible powdered compositions and the other compartment is charged with the other of the compatible powdered compositions set out in examples hereinafter described. The shoe is then passed over an opening 18 in a die block 20 filling it with such compositions as shown in Fig. 2. An upper punch 22 then descends on the material compressing it on a lower punch 24 to form and compact such composition into the body 26 illustrated in Fig. 3. As is standard practice, the pellet 26 is ejected from the die 20 by the lower punch 24 after such pelleting. The solid pellet 26 consists of a single structural body having adjacent areas 28 and 30 formed of the two compatible compositions. It is held for easy handling by the usual binding material. After firing to maturity in a manner well known in this industry, the pellet becomes a solid dielectric body with the adjacent areas having different characteristics of K, TC, piezo-electric or leakage. The two areas are strongly connected at the juncture or coalescent line if the compositions are compatible.

Figure 5:
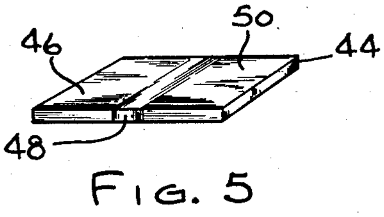
Fig. 5 is a perspective view of the modified form of dielectric body resulting from pelleting and pressing the material deposited in the die of Fig. 4.

In the modification shown in Figs. 4 and 5, the filler shoe 32 has three compartments 34, 36, and 38 formed by the two thin partitions 40 and 42. The compartments may be charged with different compatible compositions or the outer compartments 34 and 38 may be charged with identical compositions and the inner compartment 36 charged with a different compatible composition. This filler shoe will deposit the material in the die cavity 18 in the same manner as heretofore described and upon operating the press a pellet 44 illustrated at Fig. 5 is formed having three areas 46, 48, and 50. This pellet is also fired to maturity to form a solid dielectric body with the areas having the characteristics of K, TC, piezo-electric etc. determined by the compatible compositions used.

Other types of filler shoes may be used having any desired number of cavities of varying shapes to form a structurally continuous pellet, the different areas of which having compositions of compatible dielectric material with different characteristics. It is also possible to form the pellet by piecing together several preformed shapes of different composition and then pressing such pieced together body to make it unitary in structure. Thus any number of desired shapes may be included in the final unit.

The following are examples of some compositions of low K and some compositions of high K which are compatible by the tests heretofore set forth and will mature by simultaneous firing into a single dielectric plate with adjacent high and low K areas strongly structurally connected, the materials of each composition being expressed in percentage of the whole, the composition with higher K value being placed in the left column and the composition with the lower K value being placed in the right column, Examples 1 to 4 being titanate bodies and Examples 5 and 6 illustrating titania bodies and steatite bodies:

EXAMPLE 1

| Material | Percent | K | Material | Percent | K |
|---|---|---|---|---|---|
| $BaTiO_3$ | 100 | 1,620 | $BaTiO_3$ | 50 | 350 |
| | | | $CaTiO_3$ | 50 | |

EXAMPLE 2

| Material | Percent | K | Material | Percent | K |
|---|---|---|---|---|---|
| $BaTiO_3$ | 68 | 6,300 | $CaTiO_3$ | 70 | 95 |
| $CaTiO_3$ | 7 | | $MgZrO_3$ | 30 | |
| $SrTiO_3$ | 15 | | | | |
| $BaZrO_3$ | 10 | | | | |

EXAMPLE 3

| Material | Percent | K | Material | Percent | K |
|---|---|---|---|---|---|
| $BaTiO_3$ | 60 | 3,300 | $BaTiO_3$ | 68 | 870 |
| $CaTiO_3$ | 15 | | $CaTiO_3$ | 10 | |
| $SrTiO_3$ | 25 | | $SrTiO_3$ | 12 | |
| | | | $PbTiO_3$ | 10 | |

EXAMPLE 4

| Material | Percent | K | Material | Percent | K |
|---|---|---|---|---|---|
| $BaTiO_3$ | 66 | 5,250 | $BaTiO_3$ | 10 | 124 |
| $CaTiO_3$ | 10 | | $CaTiO_3$ | 50 | |
| $SrTiO_3$ | 12 | | $SrTiO_3$ | 10 | |
| $PbTiO_3$ | 2 | | $MgZrO_3$ | 10 | |
| | | | $MgTiO_3$ | 10 | |
| | | | $BaZrO_3$ | 10 | |

EXAMPLE 5

| Material | Percent | K | Material | Percent | K |
|---|---|---|---|---|---|
| Heavy Grade $TiO_2$. | 86.5 | 80 | Steatite Talc | 83.3 | 6 |
| Mixture of rare earth oxides. | 10.0 | | $BaCO_3$ | 4.2 | |
| Ball Clay | 3.5 | | Ball Clay | 12.5 | |

EXAMPLE 6

| Material | Percent | K | Material | Percent | K |
|---|---|---|---|---|---|
| Heavy Grade $TiO_2$. | 86.5 | 80 | Steatite Talc | 78.5 | |
| Mixture of rare earth oxides. | 10.0 | | $TiO_2$ | 11.5 | |
| Ball Clay | 3.5 | | $BaCO_3$ | 10 | |

Some compositions of ceramic materials have peaks of high K at different temperatures (hereinafter called peak-temperatures) and when a single body embodying two areas each being a different peak-temperature is used as the dielectric for a single capacitor, the K to temperature curve of such capacitor will have a flattened peak (usually lower than the high peaks of each composition) extending over a temperature range somewhat equal to the range between the peak-temperatures of the two compositions. For one example, the peak-temperature of the high K (left column) composition of Example 3 occurs at about 0° C. and the peak-temperature of the high K (left column) composition of Example 4 occurs at about 40° C. These compositions are compatible and are embodied in a two area dielectric body which supports a single capacitor the electrodes of which extend over both areas. Such a capacitor has a K to temperature curve with flattened peak extending substantially within a K range of 4000 to 4500 for a temperature range of from −10° to +50° C. Such a body with areas of compatible compositions with different peak-temperatures may support a separate capacitor for each area and thus make use of the multiple peak-temperatures. Unlimited variations of curve shapes can be obtained by modifying the proportions of the areas of the different materials used and also the number and selection of the dielectric compositions.

It has been heretofore mentioned that same compatible compositions may also have controlled TC characteristics, such as is accomplished in accordance with the teachings of Patent 2,520,376. In the following example the composition of the left percentage column has a TC of N 750 p. p. m. and the compatible composition of the right percentage column has a TC of substantially zero:

| Material | Percent | Percent |
|---|---|---|
| Heavy Grade $TiO_2$ | 86.5 | 39.8 |
| Mixture of Rare Earth Oxides | 10.0 | 53.6 |
| Ball Clay | 3.5 | ---------- |
| $MgTiO_3$ | ---------- | 6.5 |

These compositions and other such compatible compositions with different values of controlled TC including both negative and positive may be embodied in a single dielectric plate which when used for a single capacitor such capacitor will have a resultant different TC.

In some cases where there is a tendency for one composition to have an undesirable excess of firing shrinkage over another compatible composition with which it is to be used, the first composition may be premixed and calcined and then ground and remixed to lower the firing shrinkage. The firing shrinkage can be raised if too low by replacing some of the calcined heavy grade $TiO_2$ with a finer grained, higher shrinking precipitated grade of $TiO_2$.

When a body is formed using the materials of Example 1, the area comprised of the $BaTiO_3$ has piezo-electric characteristics. Hence this body may provide support for diverse impedance elements associated in circuit with the plates of the piezo-electric area and thus provide a single unitary structure having enumerable uses in this field.

While several embodiments of the invention and details of procedure have been shown and described it is to be understood that ingredients, proportions, and procedures may be considerably varied without departing from the spirit of the invention and the scope of the following claims.

I claim:

1. A solid dielectric body of ceramic materials having in one portion a first ceramic composition characterized by its capability of being fired to maturity to produce selected electrical properties, and having in another portion a second ceramic composition characterized by its capability of being fired to maturity simultaneously with said first composition to produce selected electrical properties different from those of said first composition, said portions consisting of powder simultaneously pelleted and fired together to maturity to make a unitary composite body with said portions united by the intermingling which accompanies firing at the region in which said portions are in contact.

2. A dielectric body as claimed in claim 1 in which said compositions are further characterized by being free from forming excessive melting point eutectics lower than the firing temperature of either of said compositions.

3. A dielectric body as claimed in claim 2 in which said compositions are further characterized by having coefficients of expansion enough alike to permit cooling from firing temperature to ambient temperature without excessively weakening either composition.

4. A dielectric body as claimed in claim 2 in which said compositions are further characterized by having firing shrinkages enough alike to prevent tearing or cracking at the juncture area therebetween.

5. A dielectric body as claimed in claim 1 in which said compositions are further characterized by being free from forming excessive melting point eutectics lower than the firing temperature of either of said compositions, by having coefficients of expansion enough alike to permit cooling from firing temperature to ambient temperature without excessively weakening either composition, and by having firing shrinkages enough alike to prevent tearing or cracking at such juncture area.

6. A multiple element printed circuit component comprising a composite unitary fired ceramic plate of uninterrupted coherently united masses of the ceramic and having opposite faces adapted to receive a plurality of printed coatings forming electric circuit impedance elements having properties determined by the electrical properties of the underlying ceramic, said plate comprising a plurality of masses of ceramic of different electrical properties in edgewise relation fired together to make the unitary composite plate, each mass extending contiguously between the opposite faces of the plate and forming a portion of the area of each of said opposite faces and adjoining masses being in non-overlapping relation and of different electrical properties and united by the intermingling which accompanies firing at the region in which the masses are in edgewise contact, and a plurality of coatings printed on the plate on areas respectively corresponding to the different masses of ceramic and forming electric impedance elements having properties determined by the electrical properties of the respective coating and the underlying ceramic.

7. A composite unitary fired ceramic plate of uninterrupted coherently united masses of the ceramic and having opposite faces adapted to receive a plurality of printed coatings forming electric circuit impedance elements having properties determined by the electrical properties of the underlying ceramic, said plate comprising a plurality of masses of ceramic of different electrical properties in edgewise relation fired together to make the unitary composite plate, each mass extending contiguously between the opposite faces of the plate and forming a portion of the area of each of said opposite faces and adjoining masses being in non-overlapping relation and of different electrical properties and united by the intermingling which accompanies firing at the region in which the masses are in edgewise contact.

References Cited in the file of this patent

UNITED STATES PATENTS

| | | |
|---|---|---|
| 2,192,494 | Goddard | Mar. 5, 1940 |
| 2,266,813 | Ruben | Dec. 23, 1941 |
| 2,327,372 | Ruben | Aug. 24, 1943 |
| 2,399,313 | Ballard | Apr. 30, 1946 |
| 2,534,653 | Austin | Dec. 19, 1950 |
| 2,549,424 | Carlson | Apr. 17, 1951 |
| 2,566,666 | Khouri | Sept. 4, 1951 |

FOREIGN PATENTS

| | | |
|---|---|---|
| 462,639 | Great Britain | Mar. 12, 1937 |